United States Patent [19]

Anderson

[11] Patent Number: 5,031,975
[45] Date of Patent: Jul. 16, 1991

[54] CUTTING BOARD APPARATUS

[76] Inventor: Andy J. Anderson, 651 Hillcrest Ave., Livermore, Calif. 94550

[21] Appl. No.: 545,204

[22] Filed: Jun. 28, 1990

[51] Int. Cl.[5] .............................................. A43B 85/00
[52] U.S. Cl. ...................................... 312/319; 108/20; 108/78
[58] Field of Search ................... 312/331, 29, 21, 311, 312/319, 330.1; 108/78, 20, 90

[56] References Cited

U.S. PATENT DOCUMENTS

| 820,726 | 5/1906 | McQuinn. | |
|---|---|---|---|
| 1,228,288 | 5/1917 | Bower. | |
| 2,372,718 | 4/1945 | Fox | 312/29 |
| 2,722,179 | 11/1955 | Belew | 312/29 X |
| 3,770,262 | 11/1973 | Bailey. | |
| 4,041,964 | 8/1977 | Shamoon. | |
| 4,151,804 | 5/1979 | Waché et al. | 312/312 |
| 4,437,711 | 3/1984 | Dahnerl | 312/201 |
| 4,765,603 | 8/1988 | Huppert. | |
| 4,834,470 | 5/1989 | Pinnow et al. | 312/311 |

Primary Examiner—Joseph Falk
Attorney, Agent, or Firm—Thomas R. Lampe

[57] ABSTRACT

Apparatus including a housing defining an interior, a cutting board movable between a first position within the interior and a second position projecting outwardly from the housing, and transport means for selectively moving the cutting board between the first and second positions.

8 Claims, 5 Drawing Sheets

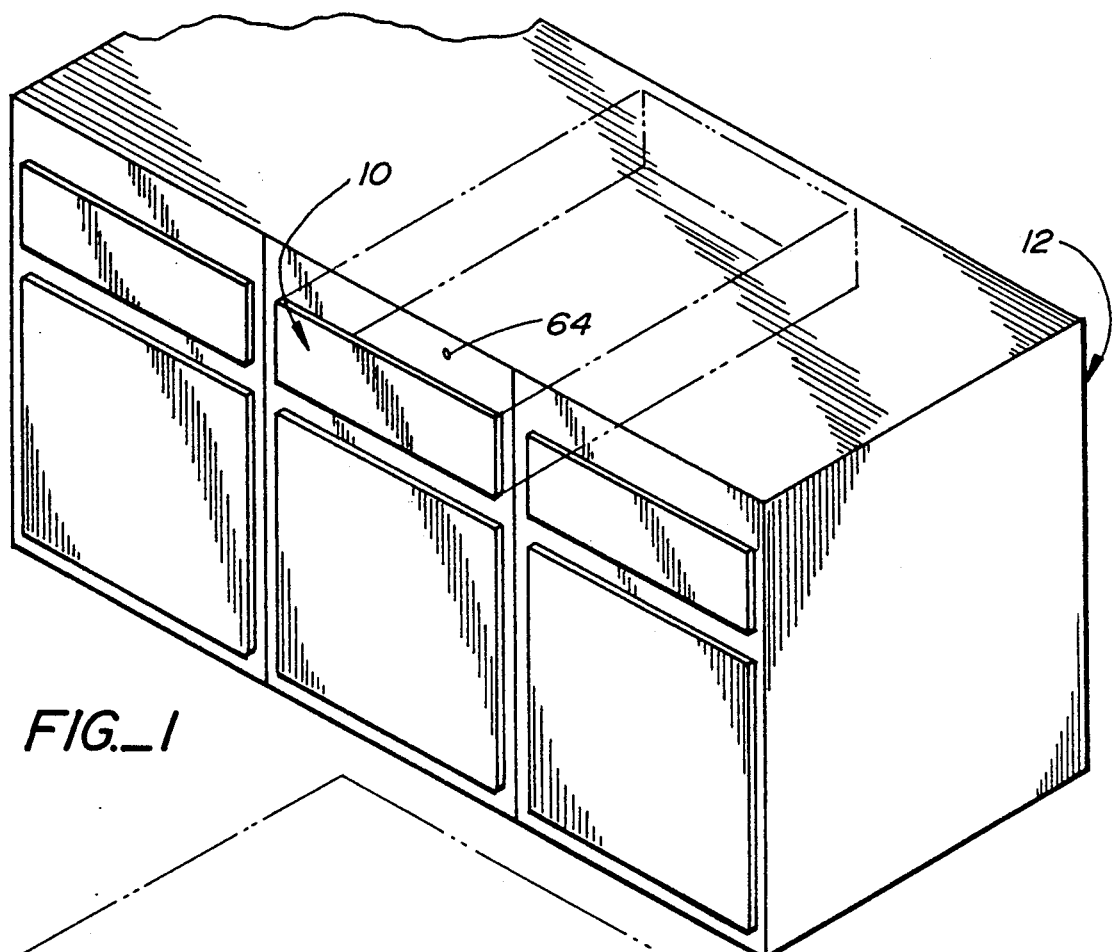
FIG._1
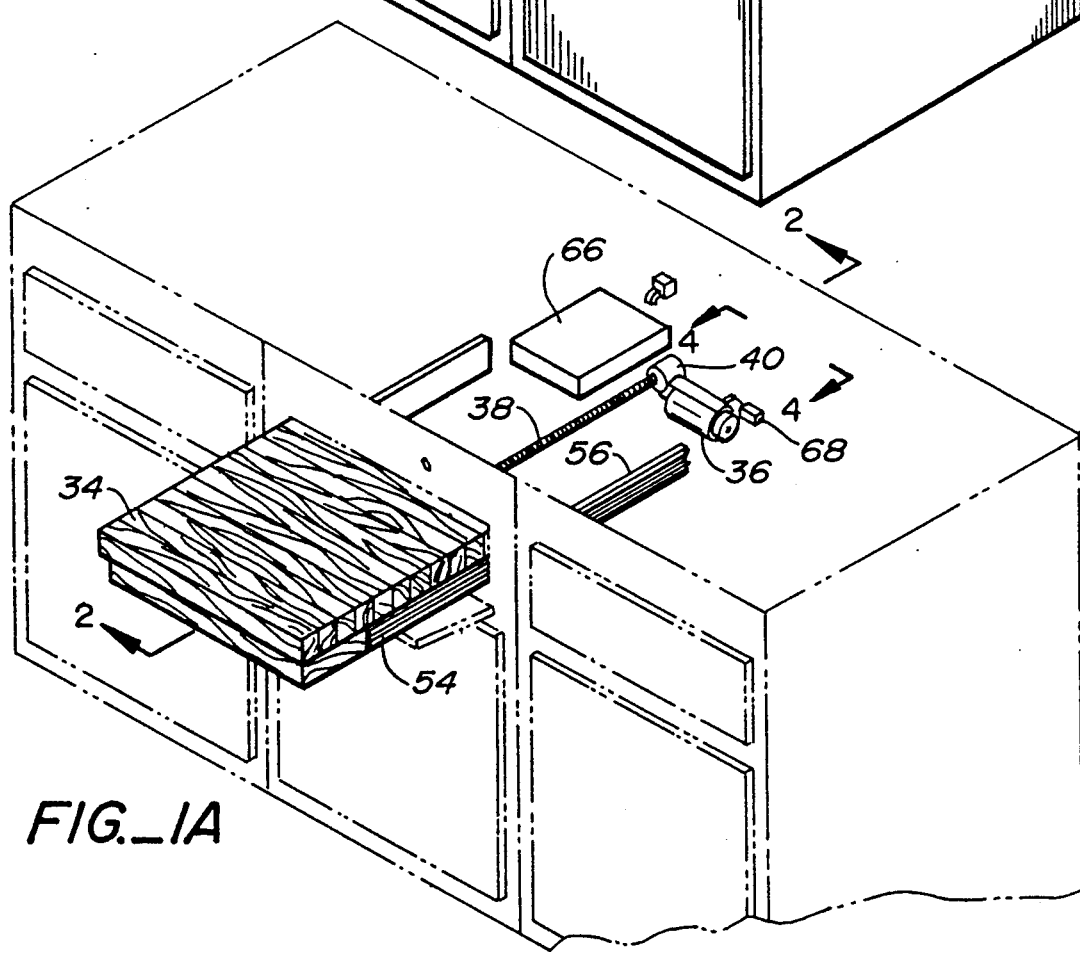
FIG._1A

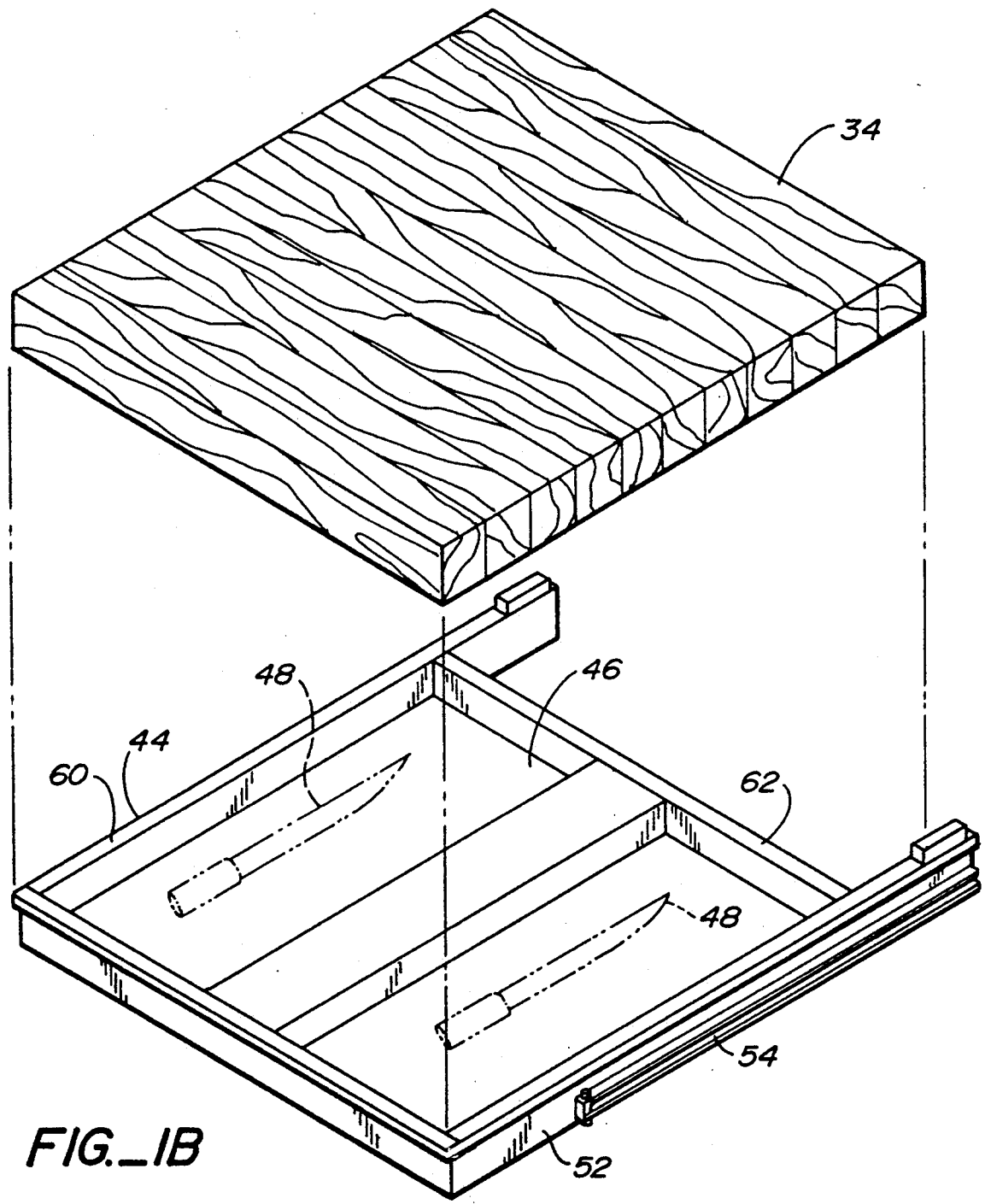
FIG._1B

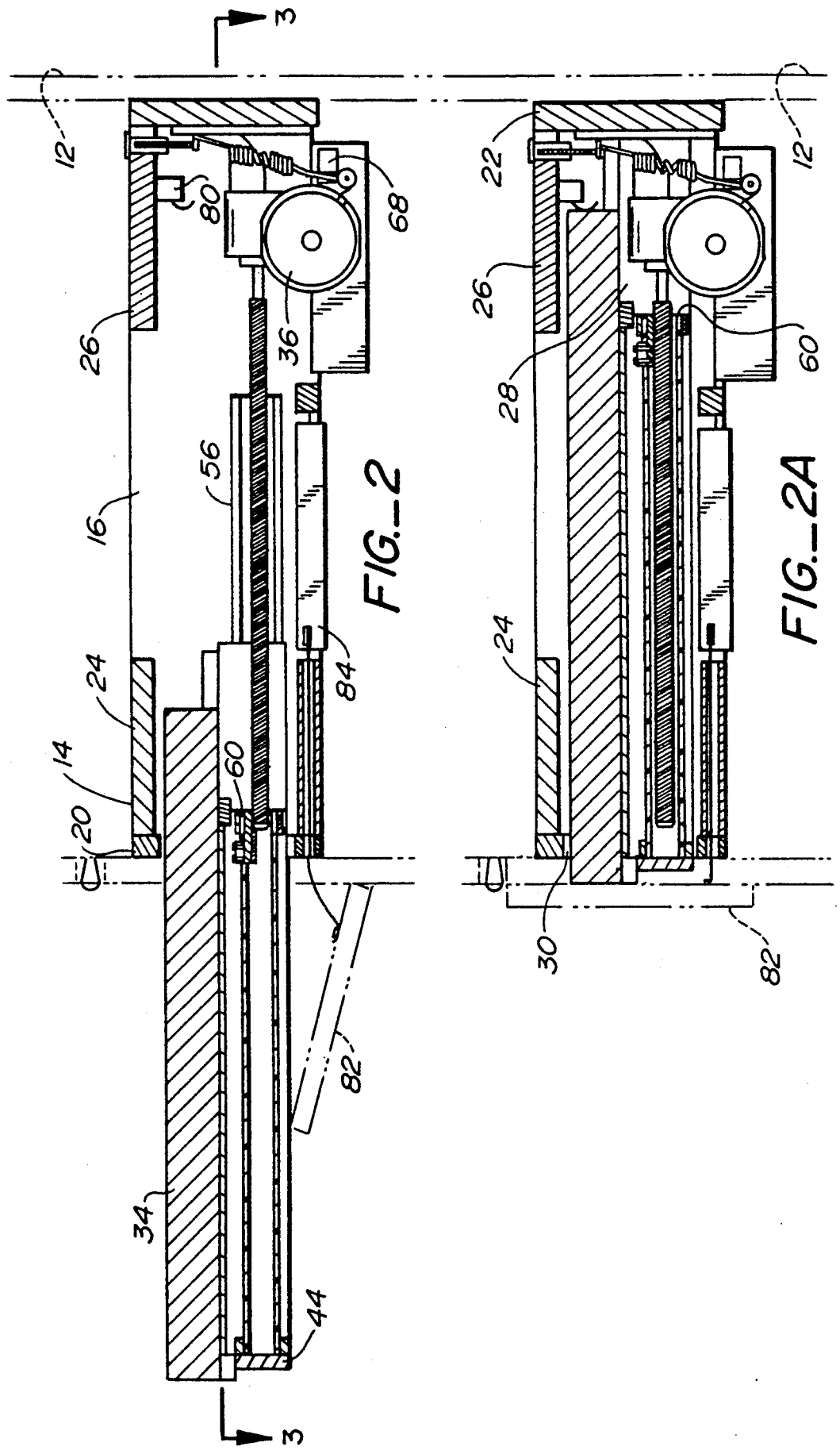

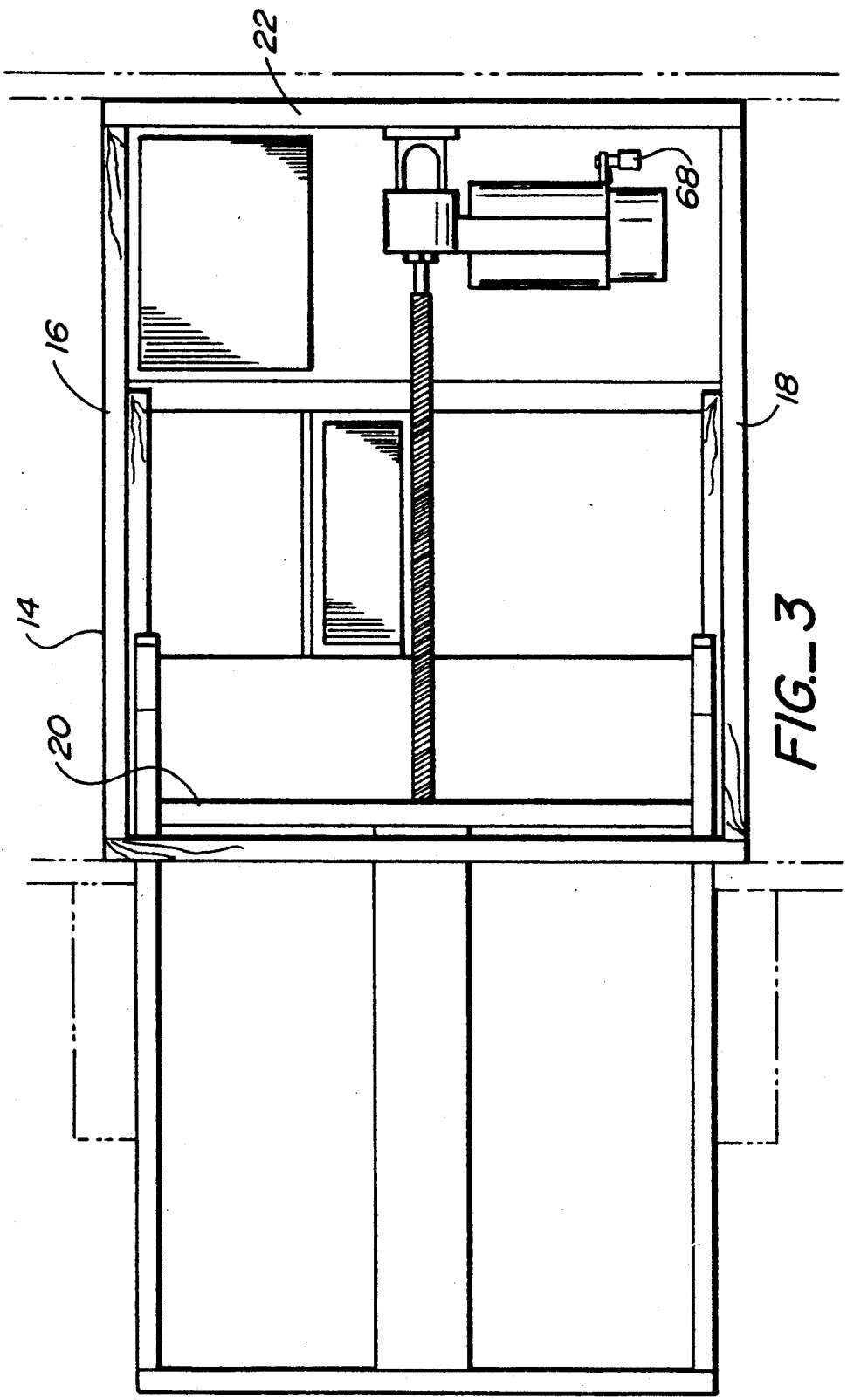
FIG._3

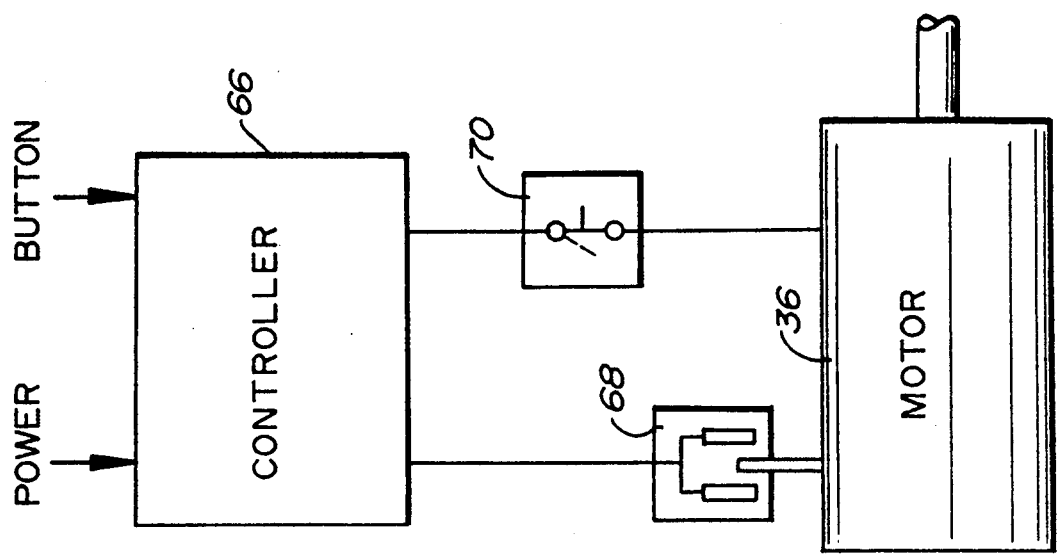
FIG._5
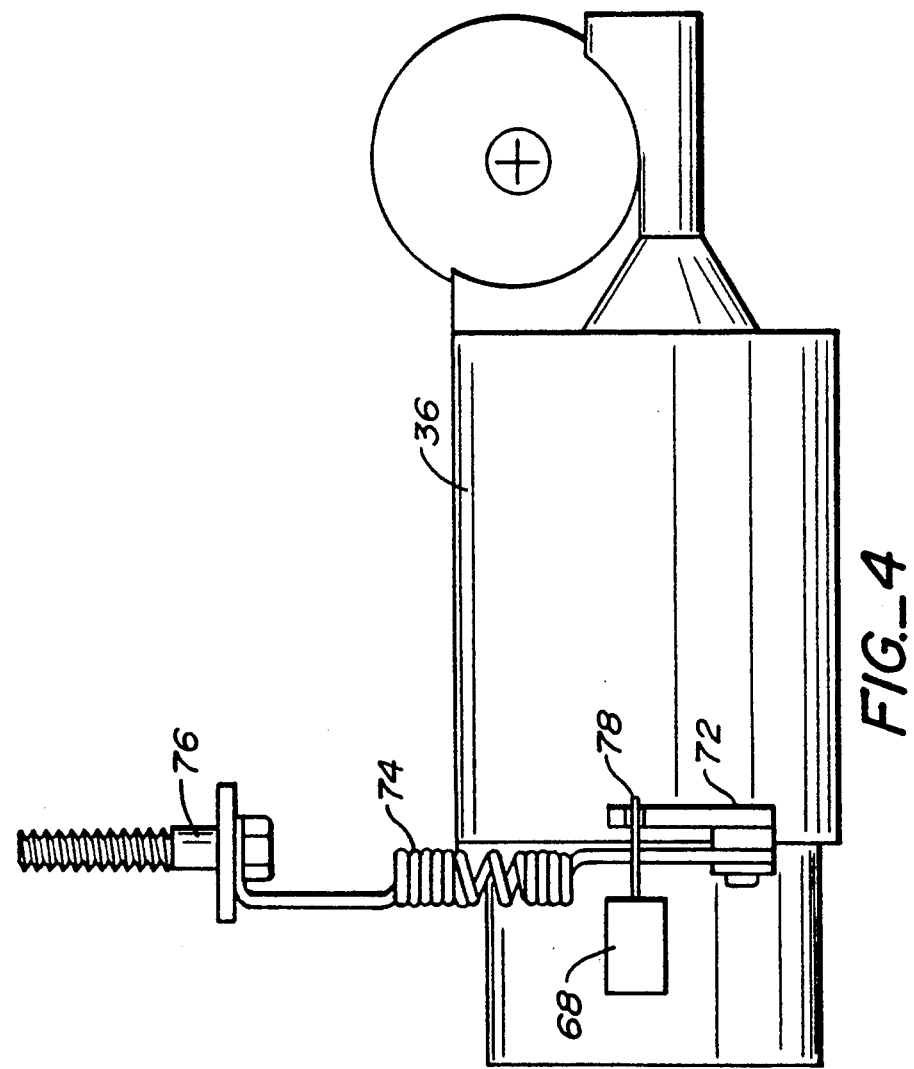
FIG._4

CUTTING BOARD APPARATUS

TECHNICAL FIELD

This invention relates to a cutting board apparatus. More particularly, the invention relates to a combination of structural elements which provide for the transport of a cutting board from a first position wherein the cutting board is disposed in the interior of a housing and a second position wherein the cutting board projects from the housing. The apparatus particularly lends itself to installation in a cabinet and operation of the apparatus is carried out with virtually no manual exertion.

BACKGROUND ART

A search of the prior art located the following U.S. Pat. Nos.: 820,726, 4,041,964, 1,228,288, 3,770,262, and 4,765,603. These patents disclose cutting board or molding board installations of various types. In some cases, the boards are movably mounted with respect to a cabinet while in others the boards are essentially fixed in place. In any event, none of the patents discloses an arrangement providing for the motorized transport of a cutting board relative to a cabinet or the like.

DISCLOSURE OF INVENTION

The apparatus of the present invention includes a housing defining an interior and an opening communicating with the interior.

A cutting board is movably mounted relative to the housing and movable between a first position wherein the cutting board is substantially disposed within the housing interior and a second position wherein at least a portion of the cutting board projects outwardly from the housing through the aperture.

The apparatus additionally includes transport means for selectively moving the cutting board between the first and second positions. The transport means includes a motor and transmission means operatively associated with the motor and the cutting board to move the cutting board responsive to actuation of the motor.

Other features, advantages, and objects of the present invention will become apparent with reference to the following description and accompanying drawings.

BRIEF DESCRIPTION OF DRAWINGS

FIG. 1 is a perspective view of a cabinet incorporating apparatus constructed in accordance with the teachings of the present invention, the apparatus being partially depicted by phantom lines;

FIG. 1A is a perspective view in a somewhat schematic format showing components of the apparatus in association with cabinet structure;

FIG. 1B is an enlarged, perspective, exploded view of the cutting board and support therefor;

FIG. 2 is a cross-sectional, side view of the apparatus illustrating the cutting board in an extended position taken along line 2—2 in FIG. 1A;

FIG. 2A is a view similar to FIG. 2 but illustrating the cutting board in a retracted position and disposed within the housing;

FIG. 3 is a view taken along line 3—3 in FIG. 2;

FIG. 4 is an enlarged side view illustrating details of the apparatus motor and motor mount taken along line 4—4 in FIG. 1A; and FIG. 5 is a schematic presentation of circuitry employed in the apparatus to actuate and de-actuate the motor.

BEST MODE FOR CARRYING OUT THE INVENTION

Referring now to the drawings, apparatus constructed in accordance with the teachings of the present invention is designated by reference numeral 10, and such apparatus is illustrated as being installed in and employed in conjunction with a conventional cabinet 12. The apparatus 10 is in modular, self-contained form and may readily be installed in a cabinet.

The apparatus 10 includes a housing 14 including spaced side walls 16, 18, a front wall 20, and a rear wall 22. The housing may also include top wall panels 24, 26 (FIGS. 2, 2A).

The housing 14 defines an interior 28 with the front wall 20 having an opening 30 formed therein which communicates with the interior.

A cutting board 34 is movably mounted relative to housing 14 and movable between a first position, shown in FIG. 2A, wherein the cutting board is substantially disposed within the housing interior and a second position, shown in FIG. 2, wherein the cutting board projects outwardly from the housing through aperture 30.

Transport means is provided for selectively moving the cutting board between the first and second positions. More particularly, the transport means includes a motor 36 and transmission means operatively associated with the motor and the cutting board to move the cutting board responsive to actuation of the motor. The transmission means includes a threaded shaft 38. One end of the shaft extends into a gear box 40. Gear box 40 may be of any suitable conventional construction and, in the usual fashion, such gear box translates rotational movement of the output shaft of the motor 36 into rotational movement of shaft 38. Motor 36 is of any suitable reversible electric motor construction.

A support 44 supports the cutting board 34. As may best be seen with reference to FIG. 1B, the support 44 defines a storage compartment 46 which may be utilized to hold kitchen utensils 48 and the like. Support 44 includes support side walls 50, 52. Track elements 54, which may be of the type commonly found in association with cabinet drawers, are affixed to the outer surfaces of support side walls 50, 52. Track elements 54 are in slidable engagement with mating track elements 56 affixed to the inwardly disposed surfaces of the side walls 16, 18. The overall outer configuration of support 44 generally corresponds to that of cutting board 34 and, in the embodiment illustrated, cutting board 34 merely rests upon support 44 and is not fixedly attached thereto. Attachment means could be employed, however, without departing from the spirit or scope of the present invention.

Threaded shaft 38 is positioned in a threaded receptacle 60 located in support rear wall 62. It will be appreciated that rotation of the threaded shaft by the motor will result in movement of the support and hence the cutting board. For example, and more particularly, rotation of the shaft in a clockwise direction will move the support and cutting board to the left as viewed in FIGS. 2, 2A, while rotation of the shaft in a counter clockwise direction will move the support and cutting board to the right as seen in those figures. The cutting board and support are normally located within the interior of the housing as shown in FIG. 2A. When, however, it is desired to use the cutting board or to have access to the storage compartment 46, the cutting board and support are located in their respective positions shown in FIG. 2.

Actuation of the motor 36 may be accomplished through any suitable controller mechanism. For example, the controller may be of the type employed in electric garage door openers. Such controller may be actuated by a remote control device or it may be actuated by a control button, such as button 64 located on the cabinet 12, hard wired thereto. In FIGS. 1A and 5, a controller is designated by reference numeral 66. Controller 66 is programmed in customary fashion to provide a desired sequence of operations. The usual first step carried out in such sequence is to actuate the motor 36 to move the support and cutting board from the housing interior, i.e. from the position shown in FIG. 2A, to the extended position shown in FIG. 2. A limit switch 70 will be closed when the support and cutting board reach full extension thereby de-actuating the motor. Limit switch 70 may be disposed at any desired location. For example, limit switch 70 may be located adjacent to and operatively associated with the output shaft of motor 36 or it may be positioned at a location where it is engaged by the cutting board support during movement thereof.

When it is desired to retract the support and cutting board, the operator again depresses the control button operatively associated with controller 66. This will cause the threaded shaft 38 to rotate in a counter clockwise direction thereby moving the support and cutting board to the right as viewed in FIGS. 2 and 2A until limit switch 70 is once again closed. Closure of the limit switch 70 will de-actuate the motor and the support and cutting board are retained within the interior of the housing in the respective positions illustrated in FIG. 2A. Alternatively, of course, two limit switches may be employed, one for de-actuating the motor when the cutting board support extends and the other when the cutting board retracts.

A torque switch device 68 is positioned closely adjacent to motor 36. Motor 36 has a bracket 72 projecting therefrom. Attached to the bracket is the lower end of a coil tension spring 74 which provides support for the motor at a location spaced from threaded shaft 38. At its upper end, spring 74 is connected to the end of an adjustment screw 76 which is threaded into a fitting extending through top wall panel 26. By turning the adjustment screw the height of the rear end of the motor can be adjusted. Switch device 68 includes a toggle 78 which passes through an opening in bracket 72.

Movement of the bracket 72 relative to the toggle 78 will occur when there is a significant degree of movement of the motor at such location. This will occur when torque forces above a predetermined degree are applied to the motor. This occurs when the cutting board support and cutting board meet an obstruction. When outward movement of the support and cutting board is resisted to a predetermined degree, the motor output shaft will meet with additional resistance and the motor itself will move due to this increase in torque forces. This will actuate switch device 68. Controller 66 then automatically stops the motor and further movement of the cutting board and support. When an obstruction prevents inward movement of the board and support, torque will be applied to the motor in the opposite opposite direction. Actuation of the switch device resulting from this condition will cause the controller to reverse the motor and the board and support to move outwardly. This will prevent such occurrences as pinched fingers. If desired, the circuitry may incorporate a kill switch 80 to de-actuate the motor if limit switch 70 for any reason fails to de-actuate the motor during the retraction mode.

It is to be noted that a cover 82 covers aperture 30 when the cutting board and the support are fully retracted, that is, located within the housing interior 28. The cover, designated by reference number 82, is attached to a coiled leaf spring 84 which normally retains the cover in the closed position illustrated in FIG. 2A. When, however, the support 44 and cutting board 34 move outwardly through opening 30 upon actuation of motor 36, the support engages the cover 82 and deflects it against the urging of spring 84 as shown. That is, movement of support 34 displaces the cover 82 from a closed position wherein the cover covers the housing opening to an open position wherein the housing opening is uncovered. The cover may, as shown, be pivotally attached to the outside of the cabinet adjacent to opening 30.

I claim:

1. Modular, self-contained cutting board apparatus for installation in a cabinet, said apparatus comprising, in combination:

a housing defining an interior and an opening communicating with said interior, said housing positionable in said cabinet with said opening in communication with the exterior of said cabinet;

a cutting board having a horizontally disposed, substantially flat cutting surface movably mounted relative to said housing and movable between a first position wherein said cutting board is substantially disposed within said housing interior and a second position wherein at least a portion of said cutting board projects outwardly from said housing externally of said cabinet through said aperture with said cutting surface exposed for access by a user; and transport means for selectively moving said cutting board between said first and second positions along a predetermined horizontal path of movement, said transport means including a cutting board support for supporting said cutting board, a motor, and transmission means operatively associated with said motor and said cutting board support to move said cutting board end-wise along said predetermined horizontal path of movement responsive to actuation of said motor, said cutting board support being connected to said transmission means, said transmission means including a threaded shaft rotatable by said motor, and said cutting board support defining a receptacle threadedly engaged with said shaft, rotation of said shaft relative to said receptacle imparting movement to said cutting board support and cutting board between said first and second positions, the cutting board cutting surface being disposed above said cutting board support whereby access to said cutting surface by a user is unimpaired by said cutting board support when said cutting board portion projects outwardly from said housing externally of said cabinet.

2. The apparatus according to claim 1 additionally comprising a cover movably mounted relative to said housing externally of said cabinet and movable between a closed position wherein said cover covers said housing opening and an open position wherein said housing opening is uncovered and spring biasing means operatively connected with said cover and said housing continuously urging said cover to said closed position.

3. The apparatus according to claim 2 wherein said cover is engageable by either said cutting board or said cutting board support during movement of said cutting board from said first position to said second position to move said cover from said closed position to said open position against the bias exerted by said spring biasing means.

4. The apparatus according to claim 1 including means for interrupting movement of said cutting board as said cutting board moves between said first position and said second position responsive to said cutting board engaging an obstruction.

5. The apparatus according to claim 4 wherein said means for interrupting movement of said cutting board includes means for sensing when a predetermined magnitude of torque is applied to said motor.

6. The apparatus according to claim 5 wherein said torque sensing means comprises torque switch means located adjacent to said motor, said motor being mounted for movement relative to said torque switch means and engageable with said torque switch means when the torque applied to said motor exceeds said predetermined magnitude.

7. The apparatus according to claim 1 additionally comprising limit switch means for de-actuating said motor after said cutting board has moved between said first and second positions.

8. The apparatus according to claim 1 wherein the support defines a storage compartment and wherein the cutting board is positioned over said storage compartment and selectively manually removable from the support to expose said storage compartment.

* * * * *